No. 801,730. PATENTED OCT. 10, 1905.
H. M. LOFTON.
LUBRICATOR.
APPLICATION FILED OCT. 29, 1904.
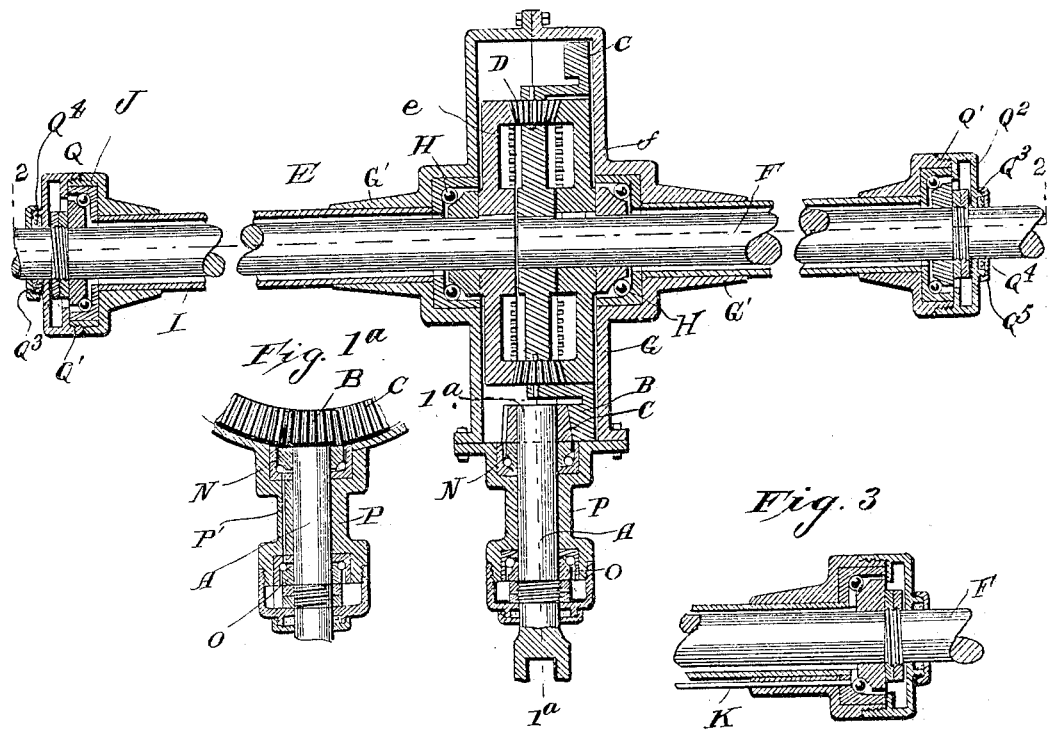
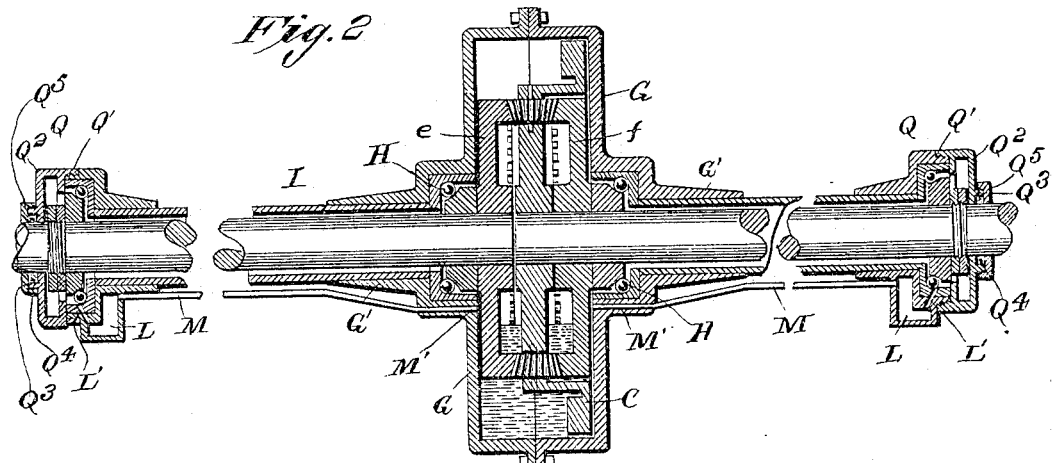
WITNESSES:
INVENTOR
Herbert M. Lofton
BY Munn & Co.
ATTORNEYS

UNITED STATES PATENT OFFICE.

HERBERT M. LOFTON, OF ATLANTA, GEORGIA, ASSIGNOR TO NATIONAL INVESTMENT COMPANY, OF SAVANNAH, GEORGIA, A CORPORATION OF GEORGIA.

LUBRICATOR.

No. 801,730.     Specification of Letters Patent.     Patented Oct. 10, 1905.

Application filed October 29, 1904. Serial No. 230,503.

*To all whom it may concern:*

Be it known that I, HERBERT M. LOFTON, a citizen of the United States, residing at Atlanta, in the county of Fulton and State of Georgia, have made certain new and useful Improvements in Lubricators, of which the following is a specification.

My invention is an improvement in lubricators especially designed for use in connection with the transmission-gear of an automobile; and the invention consists in certain novel constructions and combinations of parts, as will be hereinafter described and claimed.

In the drawings, Figure 1 is a horizontal section, partly broken away, of a transmission-gear embodying my invention. Fig. 1$^a$ is a detail vertical section on about line 1$^a$ 1$^a$ of Fig. 1. Fig. 2 is a vertical section on about line 2 2 of Fig. 1, and Fig. 3 shows a somewhat different construction within the broad principles of my invention.

By my invention I seek to provide, in connection with a shaft having inner and outer bearings and a sleeve encircling said shaft between the bearings whereby to retain such oil as may pass from the inner to the outer bearings along the shaft, a return-channel through which the oil which may from time to time be fed to the outer bearing may be returned to the inner bearing in the use of the invention.

In the construction shown in Fig. 1 the shaft A, which is the drive-shaft, is geared by a pinion B with a main gear C, which is meshed, by means of pinions D, with gears $e$ and $f$ on, respectively, the axle-shafts E and F, so the said shafts will be driven as the gear C is revolved in the use of the invention. The axle-shafts E and F may be alike and may be similarly supported, as shown, so that description of the shaft E and the parts immediately associated therewith will answer for both. The gears B, $e$, and $f$ are inclosed in a casing G, suitably formed to receive them and which is provided with the inner bearings H for the axle-shafts. The shaft E is supported in the ball-bearings at H at its inner end and extends thence outwardly through the sleeve I, which connects at its inner end with a short lateral tube G' on the casing G, and said sleeve I supports at its outer end the ball-bearings J for the outer end of the shaft E. The sleeve I is spaced sufficiently from the shaft E to permit the lubricant to pass out through the said sleeve from the inner bearing H to the outer bearing J, and in practice the oil will accumulate at the bearing J, and I therefore provide in practice a return-channel for conducting the oil from the outer bearing back to the casing in the use of the invention. In the construction shown in Fig. 3 the return-channel K connects at its outer end directly with the outer bearing for the axle-shaft; but in the construction shown in Fig. 2 and as preferred I provide at the lower side of the bearing J a reservoir L, communicating with said bearing through a port L' and affording port for the oil to accumulate in the said reservoir, from the upper side of which the channel M extends inwardly and discharges at M' into the casing G. By this construction it will be noticed that the oil which may be fed by the operation of the shaft outwardly from the inner bearing to the outer one will as it accumulates be returned to the casing, in which oil may be supplied in sufficient quantity to properly lubricate the gears as the latter operate in the use of the invention.

The drive-shaft A (see Figs. 1 and 1$^a$) is supported in inner and outer bearings N and O and is encircled by the sleeve P, in which a return-channel P' is formed, leading from the outer bearing O to the inner bearing N and which may be operated as a return-channel for the surplus oil which may accumulate in the outer bearing. As these outer bearings J and O operate as receptacles in which the oil may accumulate, I provide them with packed caps Q, which latter are threaded at Q' on the bearings, and are provided with end plates Q$^2$, which extend inwardly nearly to the shaft, and are provided near their inner ends with forwardly-projecting threaded nipples Q$^3$, forming receptacles at Q$^4$ for packing, the said nipples Q$^3$ being threaded to receive the removable caps Q$^5$, which latter may be screwed onto the nipples Q$^3$ to properly compress the packing Q$^4$ to prevent any waste of lubricant.

The construction is simple, easily applied, and will be found efficient in securing a saving of the lubricant and a circulation of the same in such manner as to prevent its accumulation and clogging at the outer bearings for the shafts.

In operation the casing G is filled with oil to about the point indicated in Fig. 2. The gear C being then revolved by the pinion B will throw the oil on the bearings H and N and the shaft P, and axles E and F in revolving will cause the oil to creep outwardly around the same, so that the oil will finally reach the outer bearings J and O. In order to prevent the oil thus accumulated from wasting, I provide the caps Q, which, fitting oil-tight around the shaft and axle, form a reservoir for the oil, as well as preventing it from being wasted at the outer bearings mentioned. The oil in reaching the bearings would finally fill them and overflow, to avoid which I provide the return-ducts M and P, which serve to return to the main casing G any surplus oil which will accumulate at the outer bearings.

Having thus described my invention, what I claim as new, and desire to secure by Letters Patent, is—

1. The combination with the drive-shaft, and the axle-shafts geared together, of the casing inclosing said parts and provided with lateral tubular portions encircling the axle-shafts and with inner bearings for the said axle-shafts, the outer bearings for the axle-shafts provided at their lower sides with reservoirs for the oil, and with ports leading from the bearings to said reservoirs, sleeves encircling the axle-shafts and extending between the inner bearings and forming conduits through which the oil may pass from the inner bearings to the outer bearings, return-channels for the oil being provided between the reservoirs at the outer bearings and the casing, the inner and outer bearings for the drive-shaft, a sleeve extending between said bearings, and a return-channel between the outer and inner bearings for the return of the oil supplied to the outer bearings, substantially as set forth.

2. The combination of the drive-shaft, the axle-shafts, geared with the drive-shaft, the casing inclosing said parts and supporting the inner bearings for the axle-shafts, the outer bearings for the axle-shafts provided at their lower sides with reservoirs for the oil, return connections extending between said reservoirs and the casing, and sleeves extending between the inner and outer bearings for the axle-shafts and through which oil may pass from the inner bearings to the outer ones to return through the return connections, substantially as set forth.

3. The combination with the casing, and a shaft communicating therewith, of inner and outer bearings for said shaft, a sleeve encircling the shaft between the bearings, and a return connection leading from the outer bearing whereby to return the oil fed outwardly by the said shaft within its encircling sleeve, substantially as set forth.

4. The combination with the casing, an axle-shaft, and a drive-shaft, of inner and outer bearings for the axle-shaft, a sleeve encircling the shaft between said bearings, the outer bearing being provided with a reservoir and with a port for leading oil from the bearing to the reservoir, and the return-tube extending between said reservoir and the casing, substantially as set forth.

5. The combination with the casing, a drive-shaft, and the axle-shaft geared together, of inner and outer bearings for the axle-shaft, a sleeve extending between said inner and outer bearings and encircling the axle-shaft, and a return-tube extending between the outer bearing and the casing, substantially as set forth.

6. The combination with a shaft, an inner bearing therefor, a casing adjacent to said inner bearing, to receive oil, an outer bearing for the shaft, a sleeve extending between said inner and outer bearings, and a return connection between the outer bearing and the casing, of a cap fitted on the outer bearing and having an end plate projecting inwardly adjacent to the shaft, and provided near its inner edge with a forwardly-projecting threaded nipple, packing within said nipple, and an end cap screwed on said nipple and compressing the packing, substantially as set forth.

7. The combination, with the drive-shaft, the driven shaft geared with the drive-shaft, and a casing inclosing said gearing and adapted to contain oil, of a sleeve encircling the driven shaft, and extending outwardly along the same, a reservoir below and in communication with said sleeve at a point remote from the casing, and a return connection between said reservoir and the casing, substantially as set forth.

8. A cap to prevent the waste of oil in lubricators and the like, having an inwardly-projected end plate, a short forwardly-projected threaded nipple, and an end cap screwed on said nipple, the latter and the end plate of the main cap having an opening for the passage of the shaft, substantially as set forth.

HERBERT M. LOFTON.

Witnesses:
SOLON C. KEMON,
PERRY B. TURPIN.